May 22, 1923.
C. C. FARMER
SAFETY CAR CONTROL EQUIPMENT
Filed June 8, 1921
1,456,268
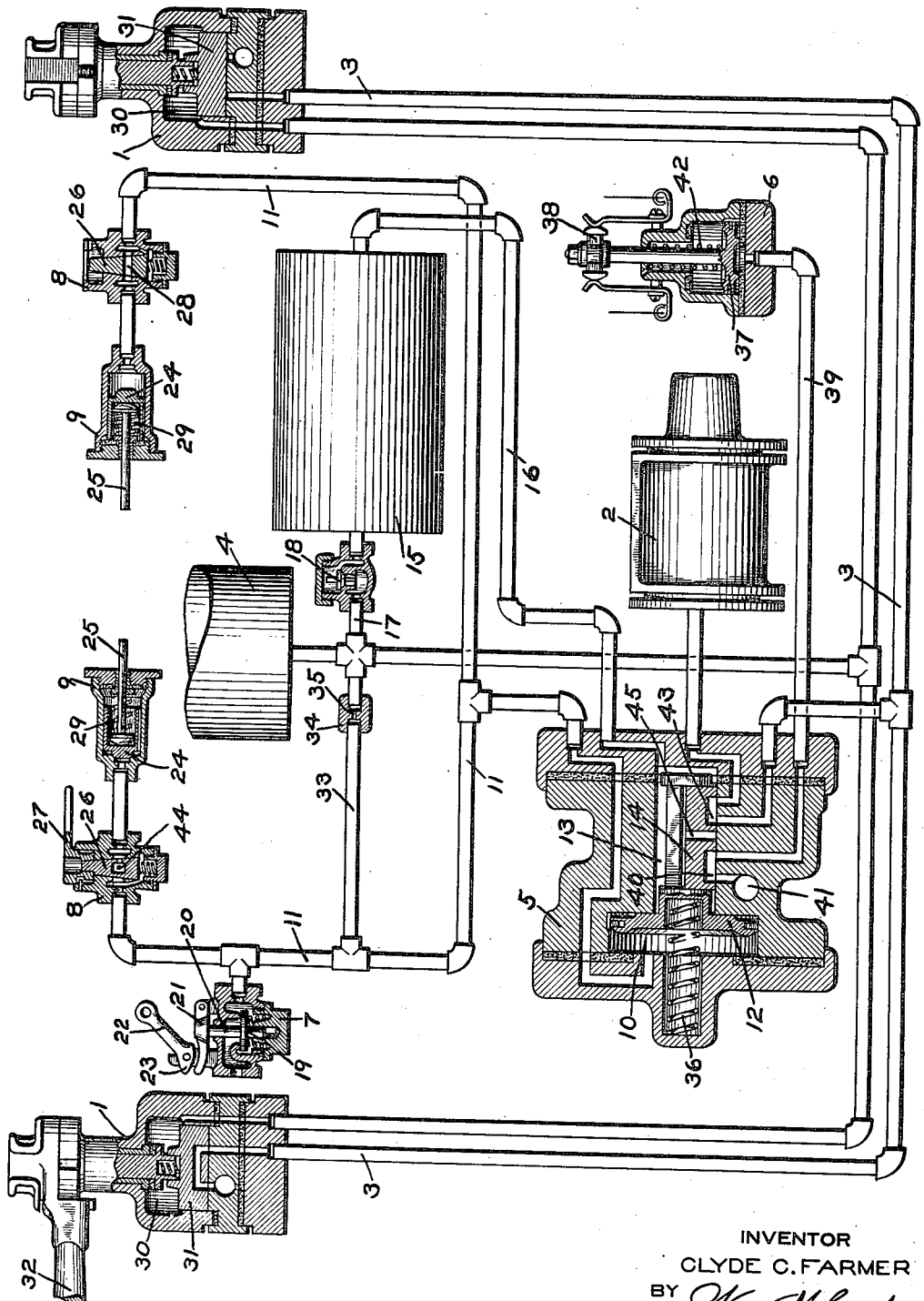
INVENTOR
CLYDE C. FARMER
BY *Wm. M. Cady*
ATTORNEY Patented May 22, 1923.

1,456,268

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

SAFETY CAR-CONTROL EQUIPMENT.

Application filed June 8, 1921. Serial No. 476,072.

*To all whom it may concern:*

Be it known that I, CLYDE C. FARMER, a citizen of the United States, residing at Pittsburgh, in the county of Allegheny and State of Pennsylvania, have invented new and useful Improvements in Safety Car-Control Equipments, of which the following is a specification.

This invention relates to safety car control devices, and more particularly to a safety car control apparatus adapted to be applied to a straight air brake equipment already in service.

The principal object of my invention is to provide an improved construction of the above character, in which a passenger on the car may cause an application of the brakes, the cutting off of power to the car, and the unlocking or balancing of the car doors, so that they may be readily opened.

In the accompanying drawing, the single figure is a diagrammatic view, partly in section, of a straight air brake equipment with a safety car control apparatus applied thereto in accordance with my invention.

As shown in the drawing, a double end straight air brake equipment is provided comprising a straight air brake valve device 1 at each end of the car, a brake cylinder 2, a straight air pipe 3, and a main reservoir 4 or other source of fluid under pressure.

The safety car control apparatus may comprise an emergency valve device 5, a power circuit controlling switch device 6, a manually operated controlling valve device 7, and a door lock controlling cock 8 for controlling a door latch device 9.

The emergency valve device 5 may comprise a casing having a piston chamber 10 connected to a pipe 11 leading to the main reservoir 4 and containing a piston 12 and a valve chamber 13 containing a slide valve 14 adapted to be operated by piston 12. Instead of connecting the valve chamber 13 directly to the main reservoir 4, an additional reservoir 15 may be provided, which is connected to said valve chamber by pipe 16 and is charged from the main reservoir 4 through a pipe 17 containing a non-return check valve 18.

The object of employing the additional reservoir is to ensure the operation of the emergency valve device, even though the main reservoir pipe should become broken and the main reservoir pressure be lost.

The emergency controlling valve device 7 may comprise a casing containing a valve 19 having a stem 20 engaging a pivoted arm 21. For operating the arm 21 a pivoted handle 22 is provided having a cam portion 23 for operating the arm 21 upon movement of the handle.

The door latch device 9, one for the car door at each end of the car, may comprise a casing containing a piston 24 for operating a car door latch 25 and the fluid pressure on said piston is controlled by the operation of plug cock 26 of the valve device 8. A removable handle 27 is provided for operating the cock 26 and said handle can only be removed in the position shown at the right of the drawing, in which the emergency pipe 11 is connected by a port 28 with the piston. In the position of the cock as shown at the left of the drawing, the piston 24 is connected to the atmosphere through the cock, permitting the spring 29 to retract the piston 24 and the door latch 25, so that the car door may be opened.

The straight air brake valve device 1 may be of the usual construction comprising a casing having a valve chamber 30 containing a rotary valve 31, adapted to be operated by the handle 32 for controlling the admission and release of fluid under pressure to and from the brake cylinder 2.

The switch device 6 may comprise a casing containing a piston 37 for operating a switch contact 38 for controlling the power circuit of the car, the piston chamber being connected by pipe 39 to the seat of the emergency slide valve 14.

In operation, the emergency pipe 11 is normally maintained charged by flow from the main reservoir 4 through pipe 33, containing a choke fitting 34 having a restricted port 35 and piston chamber 10 is charged from the emergency pipe 11. The valve chamber 13 is charged from the additional reservoir 15 and the pressures on opposite sides of piston 12 being equal, the spring 36 maintains the piston in normal release position.

In the release position of the emergency slide valve 14, the pipe 39 is connected by cavity 40 with an exhaust port 41, so that the switch device 6 is held in closed position by the spring 42. The straight air pipe 3 is connected by cavity 43 with the brake cylinder 2 so that the brakes may be applied and released by manipulation of the brake valve 1.

There is only one handle 27 on a car for operating the cock 8 and at the non-operating end of the car, the handle can only be removed in a position in which the pipe 11 is connected by port 28 with piston 24. It will thus be seen that at the non-operating end, the door latch 25 will be normally held in locked position by fluid under pressure supplied to the piston 24 through pipe 11.

At the operating end of the car, the door may be locked or unlocked by the operation of the handle 27, in the position shown, at the left of the drawing, the piston chamber of piston 24 being vented to an exhaust port 44, to permit the movement of the latch 25 to the unlocked position. By turning the handle to the position, as shown at the right of the drawing, fluid under pressure is supplied to the piston 24 so as to shift the piston and the latch 25 to the door locking position.

If a passenger wishes to stop the car in an emergency, he may operate the handle 22 by pulling a cord or otherwise, so as to open the valve 19 and vent fluid from pipe 11. The emergency piston 12 is then operated to shift the slide valve 14, so that fluid is supplied from valve chamber 13 and the reservoir 15 to the brake cylinder 2, to effect an emergency application of the brakes. A port 45 establishes communication for supplying fluid to pipe 39, so that the switch piston 37 is operated to open the power circuit.

Fluid under pressure having been vented from pipe 11, is also vented from the door latch piston 24 at the rear end of the car, so that the piston operates to retract the latch 25, permitting the rear door to be opened by passengers in the car.

It will thus be seen that a passenger, by operating the handle 22 can cause the brakes to be applied, the power cut off, and the rear door unlatched.

Having now described my invention, what I claim as new and desire to secure by Letters Patent, is:—

1. The combination with a straight air brake equipment including a straight air brake valve, a straight air pipe, a brake cylinder, and a source of fluid under pressure, of a reservoir adapted to be charged from said source, an emergency valve device having a piston subject to the opposing pressures of said source and the reservoir and a valve adapted to be manually operated by a passenger for venting fluid from one side of and thereby operating said emergency valve device to supply fluid from said reservoir to the brake cylinder.

2. The combination with a pipe normally charged with fluid under pressure, a manually operated valve for reducing the pressure in said pipe, and means operated upon a reduction in pressure in said pipe for effecting an application of the brakes, of a fluid pressure controlled door latching device at each end of the car, the device at the non-operating end of the car being connected to said pipe.

3. The combination with a pipe normally charged with fluid under pressure, a manually operated valve for reducing the pressure in said pipe, and means operated upon a reduction in pressure in said pipe for effecting an application of the brakes, of a fluid pressure controlled door latching device at each end of the car, and a manually operated cock for connecting said device to said pipe at the non-operating end of the car.

4. The combination with a pipe normally charged with fluid under pressure, a manually operated valve for reducing the pressure in said pipe, and means operated upon a reduction in pressure in said pipe for effecting an application of the brakes, of a fluid pressure controlled door latching device at each end of the car, and a manually operated cock at each end of the car for controlling the door latching device at the operating end of the car and for connecting the device to said pipe at the non-operating end of the car.

In testimony whereof I have hereunto set my hand.

CLYDE C. FARMER.